(12) United States Patent
Swanson et al.

(10) Patent No.: US 11,619,346 B2
(45) Date of Patent: Apr. 4, 2023

(54) MODULAR DIGITAL FILTER, REGULATOR AND LUBRICATOR CONNECTOR AND SYSTEM

(71) Applicants: Daniel C. Swanson, Chicago, IL (US); Karolina Stus, Chicago, IL (US); Jeffery L. Konkle, Chicago, IL (US)

(72) Inventors: Daniel C. Swanson, Chicago, IL (US); Karolina Stus, Chicago, IL (US); Jeffery L. Konkle, Chicago, IL (US)

(73) Assignee: MILTON INDUSTRIES, INC., Chicago, IL (US)

( * ) Notice: Subject to any disclaimer, the term of this patent is extended or adjusted under 35 U.S.C. 154(b) by 344 days.

(21) Appl. No.: 17/017,646

(22) Filed: Sep. 10, 2020

(65) Prior Publication Data

US 2021/0080057 A1    Mar. 18, 2021

Related U.S. Application Data

(60) Provisional application No. 62/900,522, filed on Sep. 14, 2019.

(51) Int. Cl.

| | |
|---|---|
| *F16N 7/34* | (2006.01) |
| *B01D 46/46* | (2006.01) |
| *B01D 46/44* | (2006.01) |
| *F16N 29/04* | (2006.01) |
| *G05D 16/00* | (2006.01) |

(52) U.S. Cl.
CPC ............ *F16N 7/34* (2013.01); *B01D 46/442* (2013.01); *B01D 46/46* (2013.01); *F16N 29/04* (2013.01); *B01D 2279/00* (2013.01); *F16N 2210/00* (2013.01); *G05D 16/00* (2013.01)

(58) Field of Classification Search
CPC ........ F16N 7/34; F16N 2210/00; F16N 29/04; B01D 46/442; B01D 46/46; F15B 21/048
USPC ......................................................... 184/55.2
See application file for complete search history.

(56) References Cited

U.S. PATENT DOCUMENTS

| | | | | |
|---|---|---|---|---|
| 3,074,510 | A | * | 1/1963 | Thomas ............. B23Q 11/1084 55/DIG. 17 |
| 3,365,104 | A | * | 1/1968 | Bowman .................. F16N 7/34 222/365 |
| 3,945,465 | A | * | 3/1976 | Vander Horst ....... F15B 21/048 184/6.24 |
| 4,533,020 | A | * | 8/1985 | Yamazaki ................. F16N 7/34 285/364 |
| 6,169,338 | B1 | * | 1/2001 | Stoll ..................... F15B 21/048 307/42 |

(Continued)

*Primary Examiner* — Michael R Mansen
*Assistant Examiner* — Mark K Buse
(74) *Attorney, Agent, or Firm* — Justin Lampel

(57) ABSTRACT

A modular digital filter, regulator and lubricator (FRL) connector and system are provided. The modular digital filter, regulator and lubricator connector and system are especially suitable for use in improving compressed air quality so as to extend the life of tools and machines which are connected to the FRL devices. The connector device and system allows for a quick and efficient connection with respect to both electronics and air lines and reduces problems that arise from wire pig-tailing or accidental disconnection of the FRL. The device and system may have digital, visual and audible warnings with respect to the quality of air passing through the system and to the tools and machines.

4 Claims, 5 Drawing Sheets

(56) References Cited

U.S. PATENT DOCUMENTS

2004/0051381 A1\* 3/2004 Garner ............... F15B 13/0817
  307/11
2018/0023602 A1\* 1/2018 Ito ........................ F16B 7/0466
  403/373

\* cited by examiner

MODULAR DIGITAL FILTER, REGULATOR AND LUBRICATOR CONNECTOR AND SYSTEM

REFERENCE TO RELATED APPLICATIONS

This application claims priority to U.S. Provisional Application No. 62/900,522 filed on Sep. 14, 2019, the entire contents of which are incorporated by reference herein.

BACKGROUND OF THE INVENTION

A modular digital filter, regulator and lubricator (FRL) connector and system are provided. The modular digital filter, regulator and lubricator connector and system are especially suitable for use in improving compressed air quality so as to extend the life of tools and machines which are connected to the FRL devices. The connector device and system allows for a quick and efficient connection with respect to both electronics and air lines and reduces problems that arise from wire pig-tailing or accidental disconnection of the FRL. The device and system may have digital, visual and audible warnings with respect to the quality of air passing through the system and to the tools and machines.

Filter, regulator lubricator systems are known. For example, U.S. Pat. No. 9,027,970 to Wada discloses a connection apparatus, by which a filter, a regulator and a lubricator that constitute a fluid pressure unit are mutually connected, is equipped with a base member having a hole therein, a pair of first and second fastening members mounted respectively on one side surface and another side surface of the base member, and first and second holders in which the first and second fastening members are retained. Additionally, the first and second holders engage respectively with engagement projections of the filter, the regulator and the lubricator, and first and second nuts are screw-engaged with the first and second fastening members, whereby the fluid pressure devices are connected together through the first and second holders.

Further, U.S. Pat. No. 3,945,465 to Vander Horst discloses a unitized air line filter and lubricator having provision for a pressure regulator therebetween that can either be by-passed or rendered operative by simply opening certain preformed passages in the manifold that connect same in series with the previously-mentioned components. The manifold houses nearly all of the working parts of both the filter and lubricator and their arrangement is such that the manifold can be reversed end-for-end to accommodate opposite directions of air flow. The subassembly that includes the bowls for the filter and lubricator along with the regulator spring therebetween in the three-component version will accommodate the manifold in either of its two positions and is, therefore, reversible relative thereto. Special sets of mounting brackets permit use of a single combination unit with air line piping of various sizes. These brackets also include a quick-disconnect feature wherein the entire combination unit can be detached therefrom and either serviced or replaced with another like unit in a very short time using only an allen wrench. The subassembly that carries the bowls includes a pair of quick-disconnect latches that are manually operated without any tools being required and which provide instant access to the bowls which are also removable.

Still further, U.S. Pat. No. 4,102,473 to Draxler discloses an interlocking assembly for an air filter, air lubricator, filter-regulator piggyback or the like having a pressure vessel normally retained by a head member and an interlocking collar. The pressure vessel nests in the collar to prevent accidental separation of the head member and pressure vessel. Locking tabs on the collar from being removed unless it is sequentially raised, rotated and lowered.

However, these patents fail to describe a modular digital filter, regulator and lubricator (FRL) connector and system which are easy to use and efficient. Further, these patents fail to provide for a modular digital filter, regulator and lubricator connector and system which has both an electrical and air-line connection system which are easy to attach and remove and which prevent accidental disconnections.

SUMMARY OF THE INVENTION

A modular digital filter, regulator and lubricator (FRL) connector and system are provided. The modular digital filter, regulator and lubricator connector and system are especially suitable for use in improving compressed air quality so as to extend the life of tools and machines which are connected to the FRL devices. The connector device and system allows for a quick and efficient connection with respect to both electronics and air lines and reduces problems that arise from wire pig-tailing or accidental disconnection of the FRL. The device and system may have digital, visual and audible warnings with respect to the quality of air passing through the system and to the tools and machines.

An advantage of the present modular digital filter, regulator and lubricator (FRL) connector and system is that the present modular digital filter, regulator and lubricator connector and system does not merely rely on passive checking of an FRL as is common in other standard FRL devices, but the present device provides a digital display showing the functioning of the FRL.

An advantage of the present modular digital filter, regulator and lubricator connector and system is that the present modular digital filter, regulator and lubricator connector and system makes it easier to maintain acceptable pressure levels within an air-line of a tool or machine.

Another advantage of the present modular digital filter, regulator and lubricator connector and system is that the present modular digital filter, regulator and lubricator connector and system alerts the operator when the proper amount of lubrication may not have been added to a tool or machine being used in connection with the air-line.

Another advantage of the present modular digital filter, regulator and lubricator connector and system is that the present modular digital filter, regulator and lubricator connector and system alerts the operator when the filter may not be adequately removing moisture or particulates going to a tool or machine being used in connection with the air-line.

An advantage of the present modular digital filter, regulator and lubricator connector and system is that the present modular digital filter, regulator and lubricator connector and system reduce the likelihood of an FRL becoming accidentally disconnected or wire pig-tailing.

Yet another advantage of the present modular digital filter, regulator and lubricator connector and system is that the present modular digital filter, regulator and lubricator connector and system extends the life of tools and machinery connected to the system beyond what normal FRL devices are capable of doing.

Still another advantage of the present modular digital filter, regulator and lubricator connector and system is that the present modular digital filter, regulator and lubricator connector and system may create an audible and digital alarm (such as a flashing light) to alert a user if a predetermined pressure, or other metric of the system is reached, such as the presence of a high concentration of air contaminants or a low oil level in the FRL.

And another advantage of the present modular digital filter, regulator and lubricator connector and system is that the present modular digital filter, regulator and lubricator connector and system may save time by audibly providing a user with information related to the quality of the air in the air-line by triggering alarms if a preset metric is reached.

For a more complete understanding of the above listed features and advantages of the modular digital filter, regulator and lubricator connector and system reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

A modular digital filter, regulator and lubricator (FRL) connector and system are provided. The modular digital filter, regulator and lubricator connector and system are especially suitable for use in improving compressed air quality so as to extend the life of tools and machines which are connected to the FRL devices. The connector device and system allows for a quick and efficient connection with respect to both electronics and air lines and reduces problems that arise from wire pig-tailing or accidental disconnection of the FRL. The device and system may have digital, visual and audible warnings with respect to the quality of air passing through the system and to the tools and machines.

Figure 1:
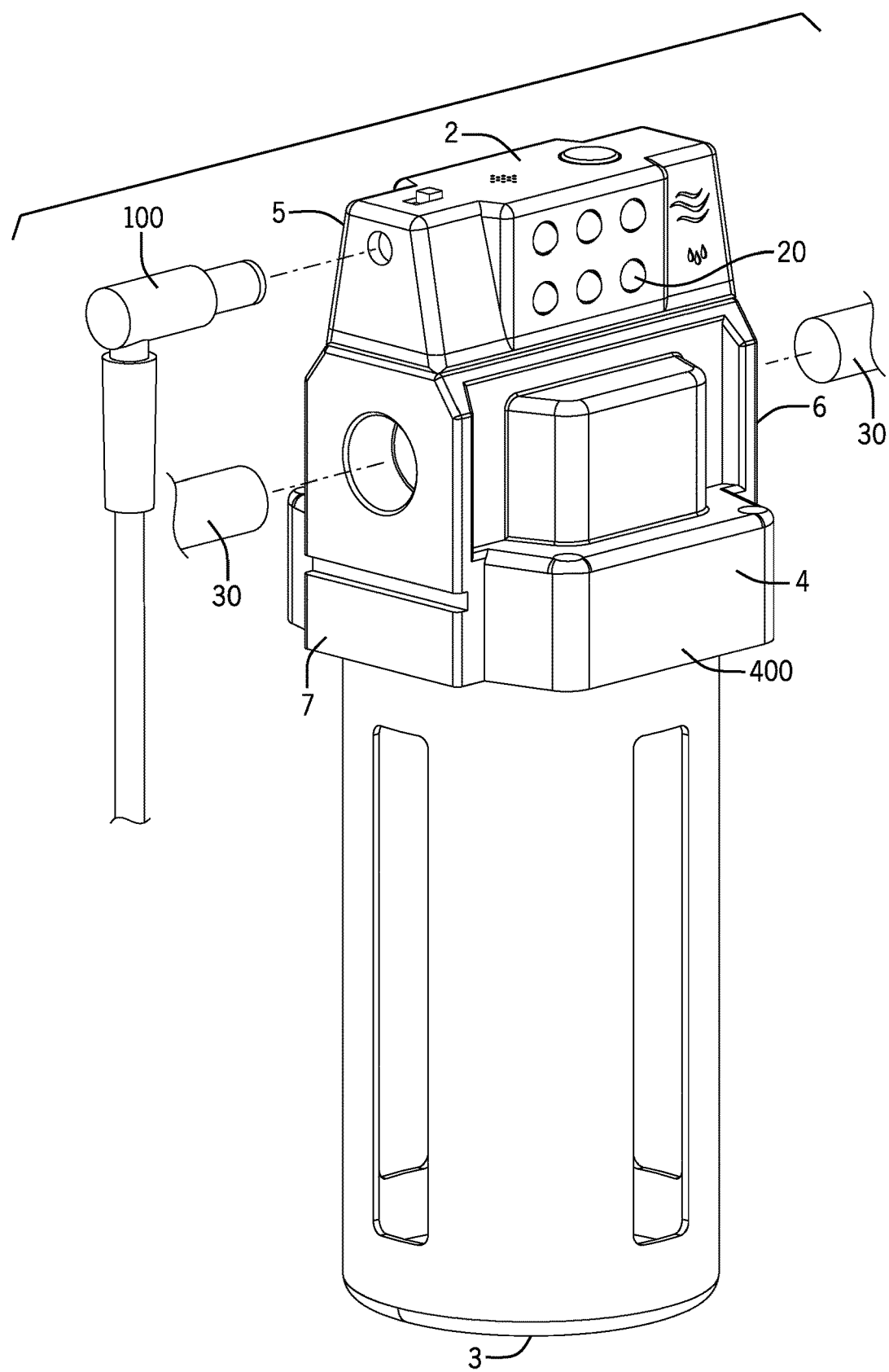
FIG. 1 illustrates a single digital modular filter as part of a FRL (filter, regulator, lubricator device) of the present system.
Figure 2:
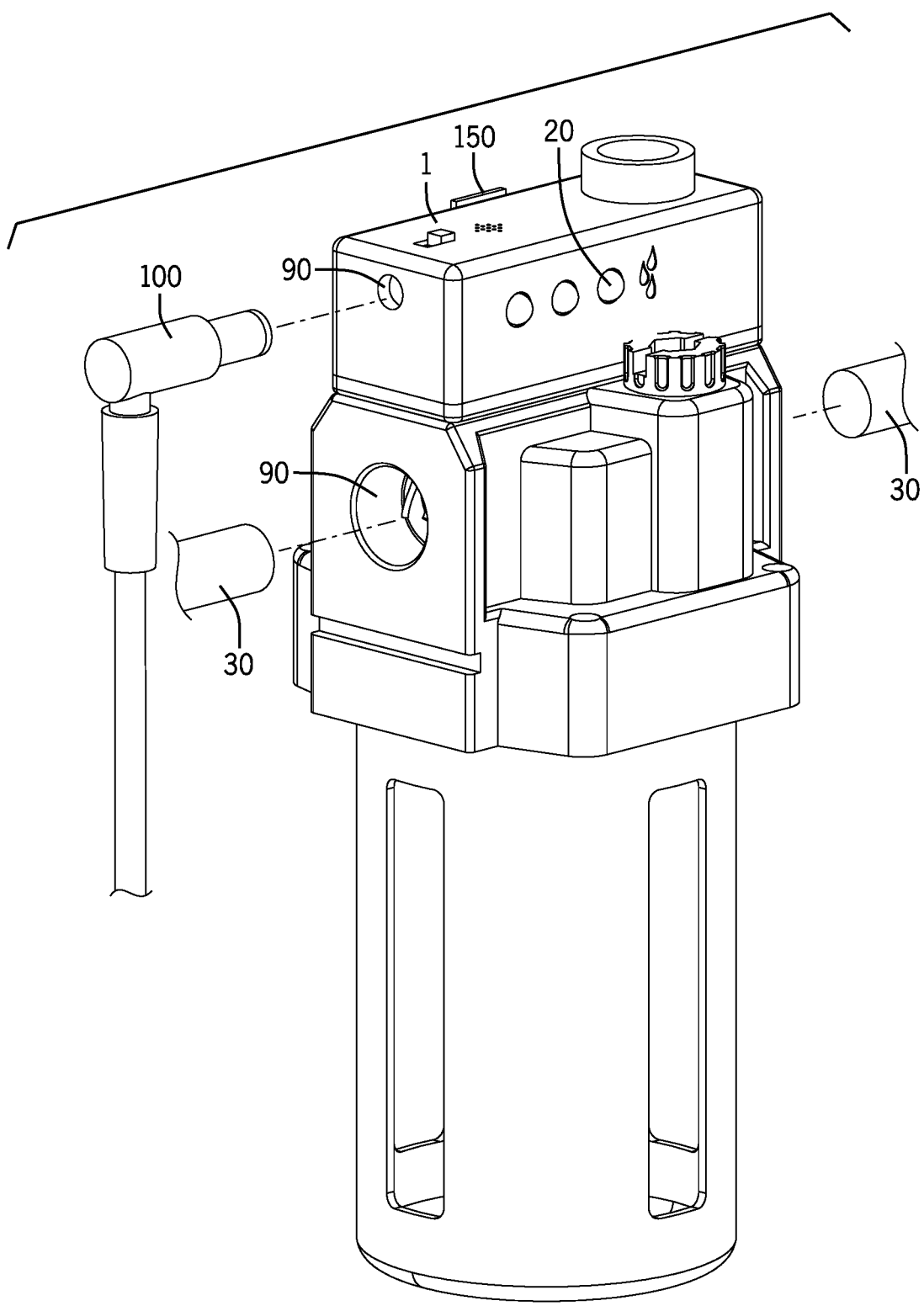
FIG. 2 illustrates a single digital modular lubricator of the present system.
Figure 3:
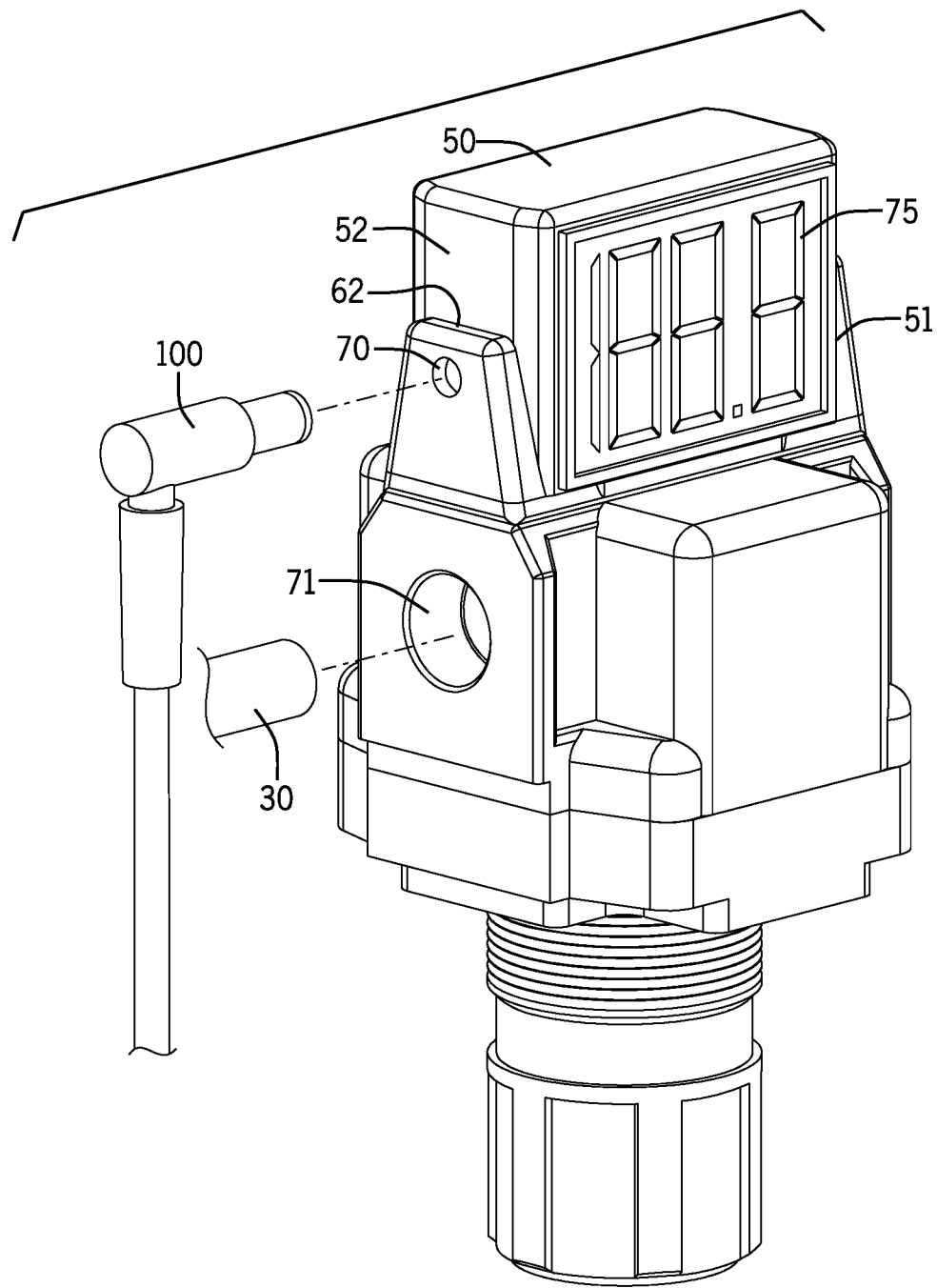
FIG. 3 illustrates a single digital modular regulator with a display indicator of the present system.
Figure 4:
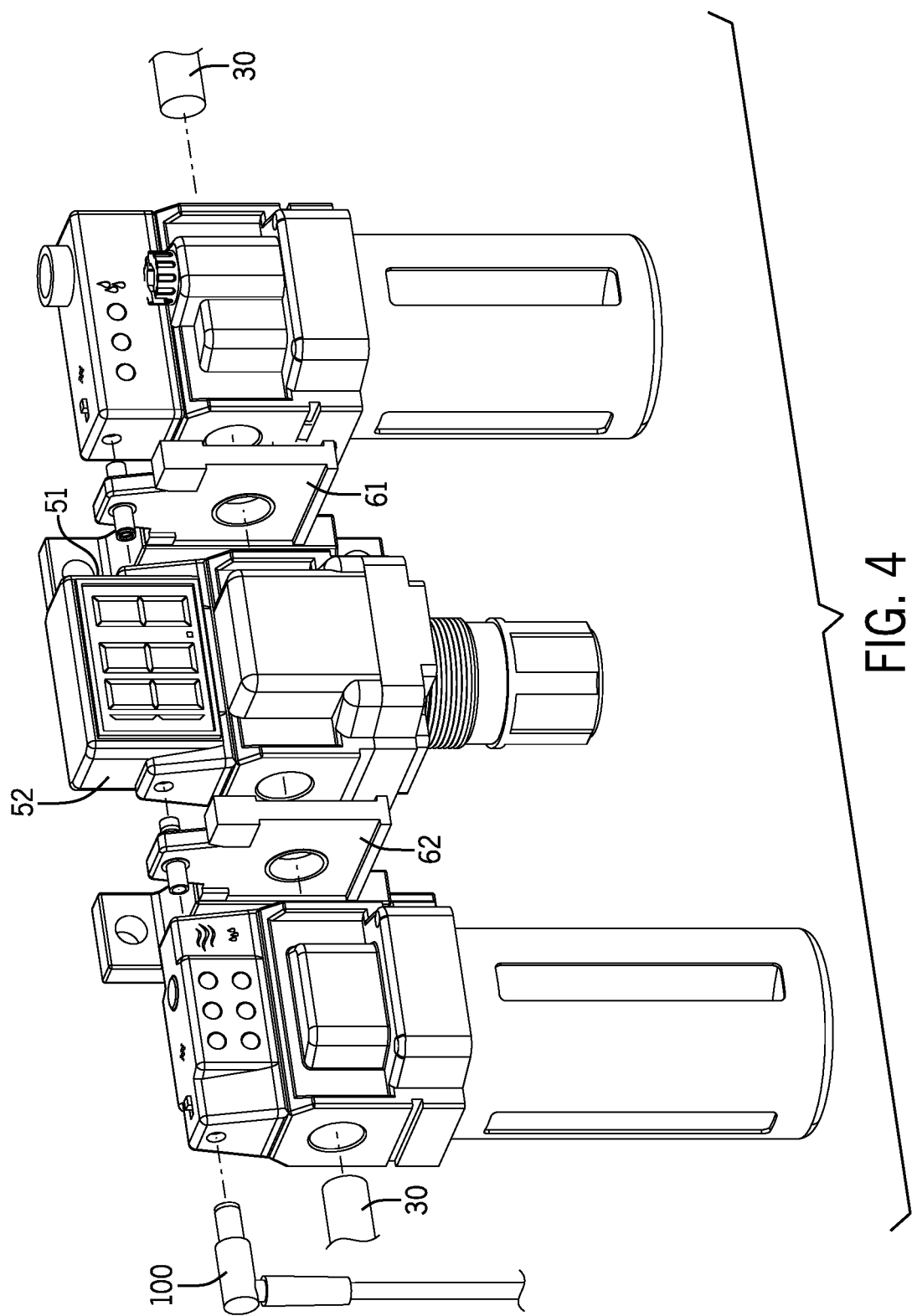
FIG. 4 illustrates an exploded FRL combination that contains a filter, regulator and lubricator connector device of the present system, used in an air-line system which would be connected to a tool or machine.
Figure 5:
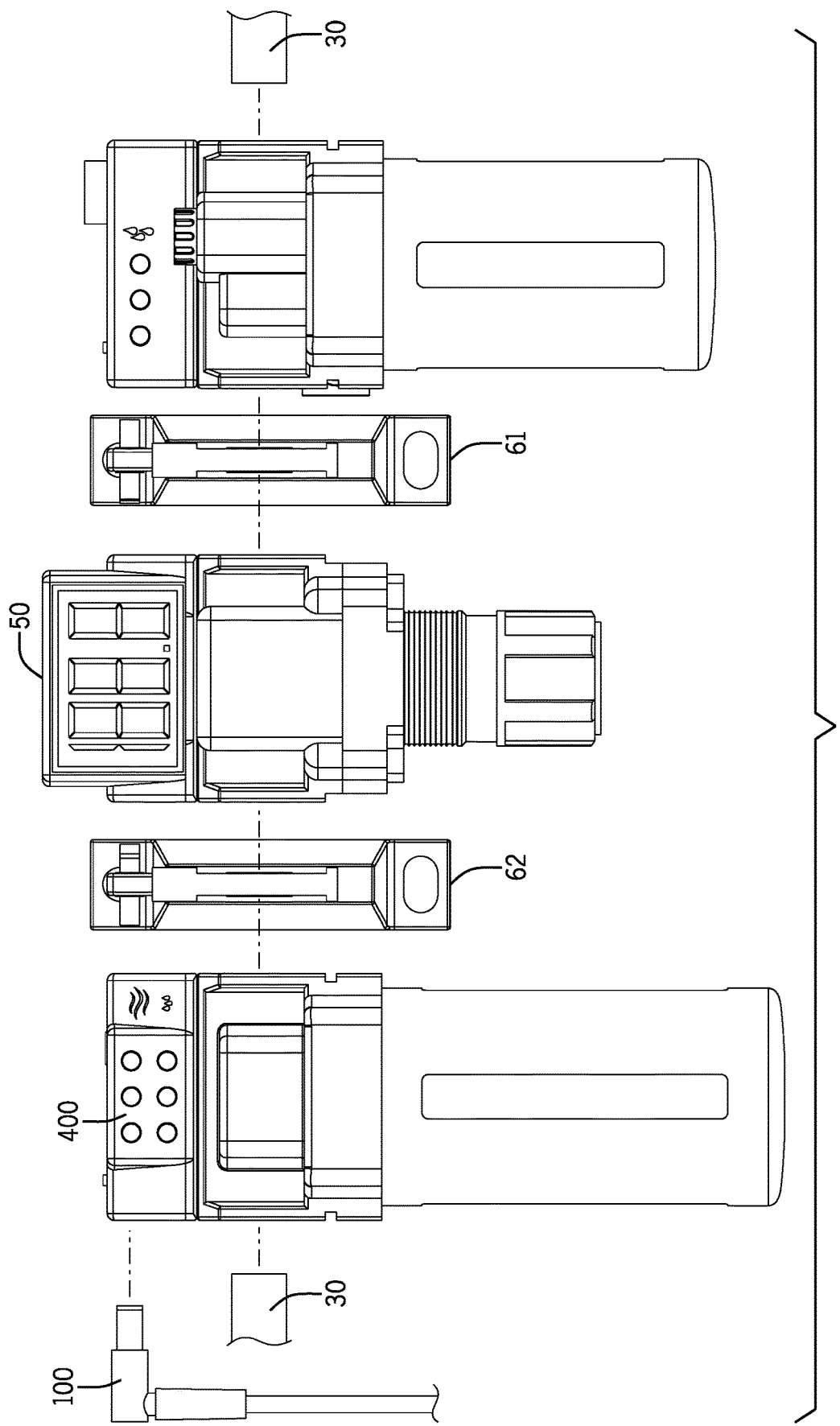
FIG. 5 illustrates a front exploded view of an FRL combination that contains a filter, regulator and lubricator connector device of the present system, used in an air-line system which would be connected to a tool or machine.

Referring first to FIG. 1, in an embodiment, a digital modular filter 400 of a FRL (filter, regulator, lubricator) connector device 1 (FIG. 2) is provided. FIG. 1 illustrates a digital filter device 400 in the single, modular design. The digital modular filter device 400 may have a top 2, a bottom 3, a front 4, a back 5, a first side 6, a second side 7 and an interior (not shown). In an embodiment, the digital modular filter device 400 is used as a standalone device as shown in FIGS. 1-3, but may also be used in a system incorporating multiple filters and other FRL devices as shown in FIGS. 4 and 5. In an embodiment, the modular filter device 400 is made of numerous materials, including, in one embodiment, metal and plastic.

The interior and/or surface of the digital modular filter connector device 400 may include electrical circuits and microchips for controlling the digital modular filter device 400 as well as sensors/indicators 20 for monitoring the quality of air within the line of the system. In an embodiment, the digital modular filter device 400 is powered by, for example, a 12V power supply. The sensors/indicators 20 connected to or located within the interior or on the surface of the digital modular filter device 400 may trigger an alarm if the air in a fluid line 30 (FIG. 4) reaches a preset pressure or other metric.

Referring now to FIG. 3, in an embodiment, a digital display unit 50 is shown on a regulator. The digital display unit 50 may have a digital screen 75 for displaying information. The digital display unit 50 may be connected to the individual regulator as shown in FIG. 3, or as part of multiple FRL devices as shown in FIG. 4. The digital display unit 50 may have a first side 51 and a second side 52. In an embodiment, the digital screen 75 may have lights of different colors (such as green or red) which may be individually activated to indicate, for example, if an air pressure range through the system is normal (green) or is abnormal (red) so that a user can easily spot any potential problems by merely looking at the digital screen 75.

A first modular connector unit 61 may be located near the first side 51 of the digital display unit 50 and a second modular connector unit 62 may be located near the second side 52 of the digital display unit 50. The modular connector units 61, 62 may be generally made of plastic and/or metal and may have a first opening 70 and a second opening 71. The first opening 70 may receive an electrical plug 100 which provides power to the digital display unit 50 and to the other FRL device(s) 1. In the preferred embodiment the electrical plug 100 assures that constant power is provided to the components/units of the system. In an alternative embodiment to the electrical plug 100, in one embodiment the components of the system may be battery powered. In an embodiment, the modular connector units 61, 62 openings may be electrical so that a user may align a large number of components (such as filters, regulators and lubricators) and have them be electrically connected to each other by the electrical openings of the modular connector units 61, 62.

The second opening 71 may be larger in diameter than the first opening 70 and may connect an air fluid passages 30 which may move air through to one of the FRL devices for processing and monitoring before exiting to a tool or machine (not shown). In particular, as the plug 100 and air lines 30 pass through the modular connector units 61, 62 they are properly connected to their respective sockets 90 (FIG. 2) in the FRL devices. The individual FRL devices have sockets 90 on both sides which can receive power from either the electrical plug 100 or a power connector. In an embodiment, the sockets 90 are located on opposing sides of the individual FRL devices so that the entire compressed air line system may extend along a straight line along a single axis.

In an embodiment the modular connector 61 and the second modular connector 62 of the digital display unit 50 are durable so as to properly align with and support both the electrical plug 100 and the air fluid line. To attach one FRL device 1 to an air system a user merely installs the digital FRL device in line with the air fluid line 30. The electrical plug connection 100 provides power through the openings and connectors 70,71 of the modular connectors 61, 62 to power the entire digital display assembly without the need to otherwise plug in the FRL devices separately into their own individual power sources (such as a wall or battery).

In an embodiment, a plurality of FRL devices 1 and a plurality of digital display units 50 are utilized. In particular, a single room of a manufacturing plant may have, for example, hundreds of various FRL devices and digital displays 50 connected. An audible alarm may alert a user that, for example, a specific filter needs to be changed in the FRL device 1 so that only clean or acceptably modified compressed air enters the tools or machines and the tools and machines remain operational for an extended life period. A user may easily change out any of the FRL devices 1 and/or digital displays 50 in the system for updating and/or replacing.

In an embodiment, the FRL device 1 may be connected wirelessly. For example, a Bluetooth connector chip 150 (FIG. 2) may allow the FRL connector 1 and system to be monitored remotely on, for example, a computer or smartphone.

Raw air entering the modular filter 400 is typically dirty (containing particulates, compressor oil vapor and humidity) and is at a higher pressure than the air the tools or machinery require. Air typically passes through the modular filter 400 first, which removes moisture and particulates. The next modular device in line is typically the regulator which allows a user to adjust down from line pressure (usually between 120 to 170 PSI) to the desired pressure (usually around 90 PSI).

The next device in the system is typically the lubricator, which adds oil to the air when oil is desired. For air tools or pneumatic pistons, oil is necessary. For tire inflation or for paint spraying, oil is undesirable. Different applications require different FRL configurations. Each FRL component may have a threaded air input on the left and a threaded air output on the right. Connections may also be made with threaded brass nipples with other FRLs, but for digital, the modular connector provides a more advantageous air and electrical connection. The air would pass (usually left to right in FIG. 4) through a hole 71 when modularly connected.

The air line 30 (which is located on both sides of the FRL devices as shown in FIG. 1) could either be hard threaded into the filter or could be attached to a modular block that would attach to the left side of the filter much like the modular connectors do. The air line 30 going to the machinery or tool that is shown exiting the lubricator of FIG. 4 would be connected in the same way by directly threading to the last component in the system or by attaching to a modular block that is attached to the last component.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

We claim:

1. A filter, regulator, lubricator system for an air-line system of a machine or tool comprising:
   at least a first filter unit, at least a first regulator unit, at least a first lubricator unit;
   wherein the first filter unit has a top, a bottom, a front, a back, a first side, a second side and an interior;
   at least a first opening on the first filter unit and at least a second opening on the first filter unit;
   at least a first air-line connection hose wherein the first filter unit, the first regulator unit, and the first lubricator unit are connected to the first air-line connection hose of the system;
   a first modular connector unit located between the first filter unit and the first lubricator unit; and
   wherein the first modular connector unit has a first opening and wherein the first opening of the first modular connector unit is electrical and electrically connects the first filter unit to the first lubricator unit.

2. The filter, regulator, lubricator system for an air-line system of a machine or tool of claim 1 wherein the air-line connection hose contains compressed air.

3. The filter, regulator, lubricator system for an air-line system of a machine or tool of claim 1 further comprising:
   a sensor electrically connected to the first filter unit wherein the sensor emits a warning if a predetermined air qualify measurement is determined.

4. The filter, regulator, lubricator system for an air-line system of a machine or tool of claim 1 further comprising:
   a digital screen attached to the first filter unit for reading a predetermined air quality measurement.

* * * * *